United States Patent
Gao et al.

(10) Patent No.: US 12,337,547 B2
(45) Date of Patent: Jun. 24, 2025

(54) MATERIAL RECONDITIONING DEVICES AND DISPENSING SYSTEMS

(71) Applicant: GM GLOBAL TECHNOLOGY OPERATIONS LLC, Detroit, MI (US)

(72) Inventors: Dalong Gao, Rochester, MI (US); Ryan Gergely, Fraser, MI (US); Prateek Mishra, Rochester, MI (US); Paul E. Crittenden, Metamora, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 326 days.

(21) Appl. No.: 17/879,851

(22) Filed: Aug. 3, 2022

(65) Prior Publication Data
US 2024/0042704 A1 Feb. 8, 2024

(51) Int. Cl.
*B29C 65/52* (2006.01)
*B05C 11/10* (2006.01)
*B29C 37/00* (2006.01)

(52) U.S. Cl.
CPC ........ *B29C 65/524* (2013.01); *B05C 11/1013* (2013.01); *B29C 2037/90* (2013.01)

(58) Field of Classification Search
CPC .......................... B29C 65/524; B05C 11/1013
USPC .............................. 222/351; 427/207.1–208.8
See application file for complete search history.

(56) References Cited

U.S. PATENT DOCUMENTS

| 4,865,459 A * | 9/1989 | Yamada ................ B01F 33/862 366/270 |
| 7,429,299 B2 * | 9/2008 | McGlinchy ........... B05C 5/0216 118/712 |
| 2022/0379274 A1* | 12/2022 | Shi ........................ B01F 27/272 |

FOREIGN PATENT DOCUMENTS

KR 2010-0004827 U * 5/2010 ............. A63B 67/06

OTHER PUBLICATIONS

Machine translation KR20100004827U (Year: 2010).*

* cited by examiner

*Primary Examiner* — Jacob T Minskey
*Assistant Examiner* — Wayne K. Swier

(57) ABSTRACT

A reconditioning device includes: a first shearing plate; a second shearing plate; and a housing. The housing includes: a first member configured to hold the first shearing plate and comprising an input for receiving a material; a second member connected to the first member to form an inner cavity, a portion of the inner cavity is located in a gap between the first shearing plate and the second shearing plate; and an output member connected to a pipeline of a production applicator and configured to output the material subsequent to shearing. The shaft extends through the second member, is connected to the second shearing plate, and is configured to be rotated to shear the material disposed in the gap between the first shearing plate and the second shearing plate.

17 Claims, 7 Drawing Sheets

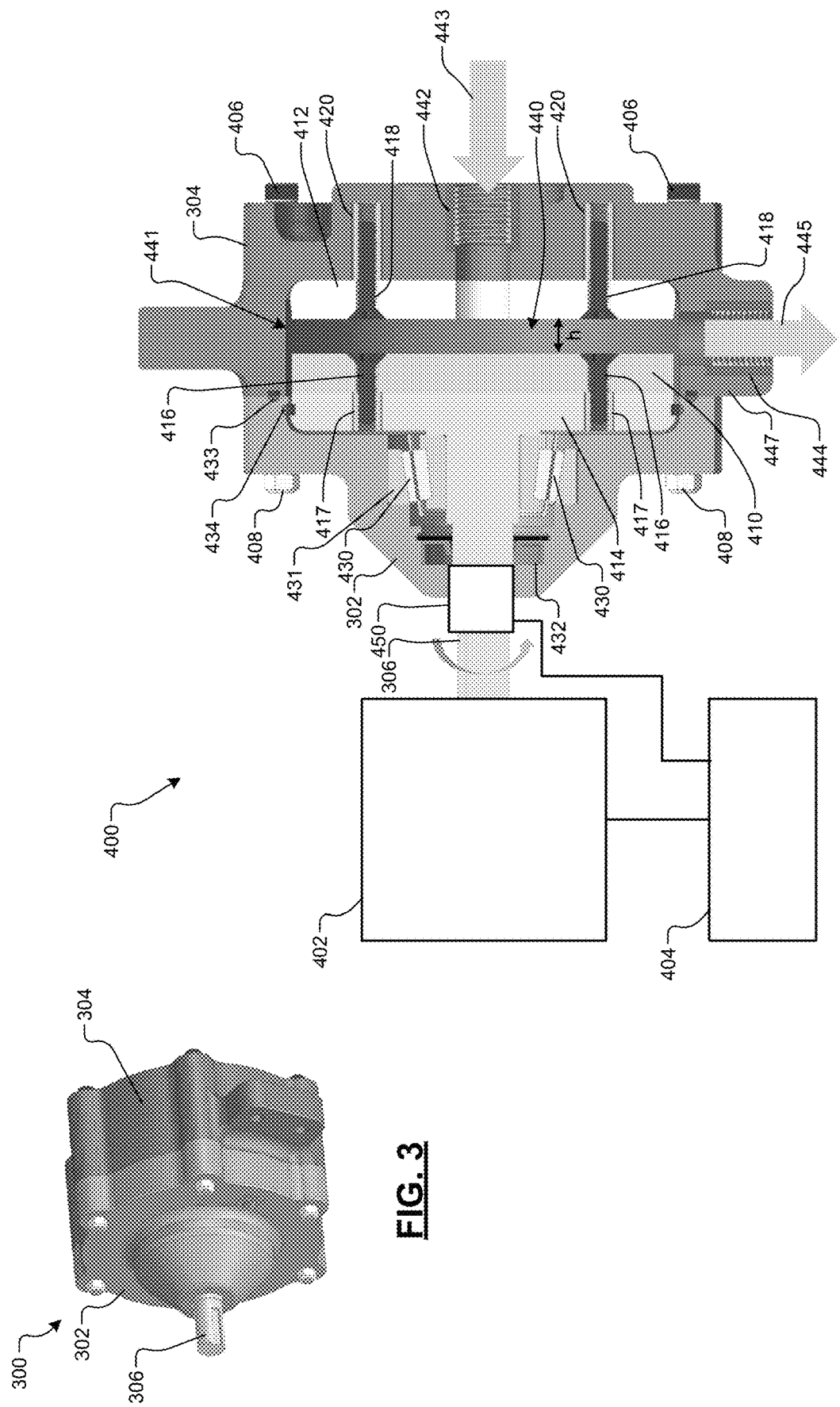

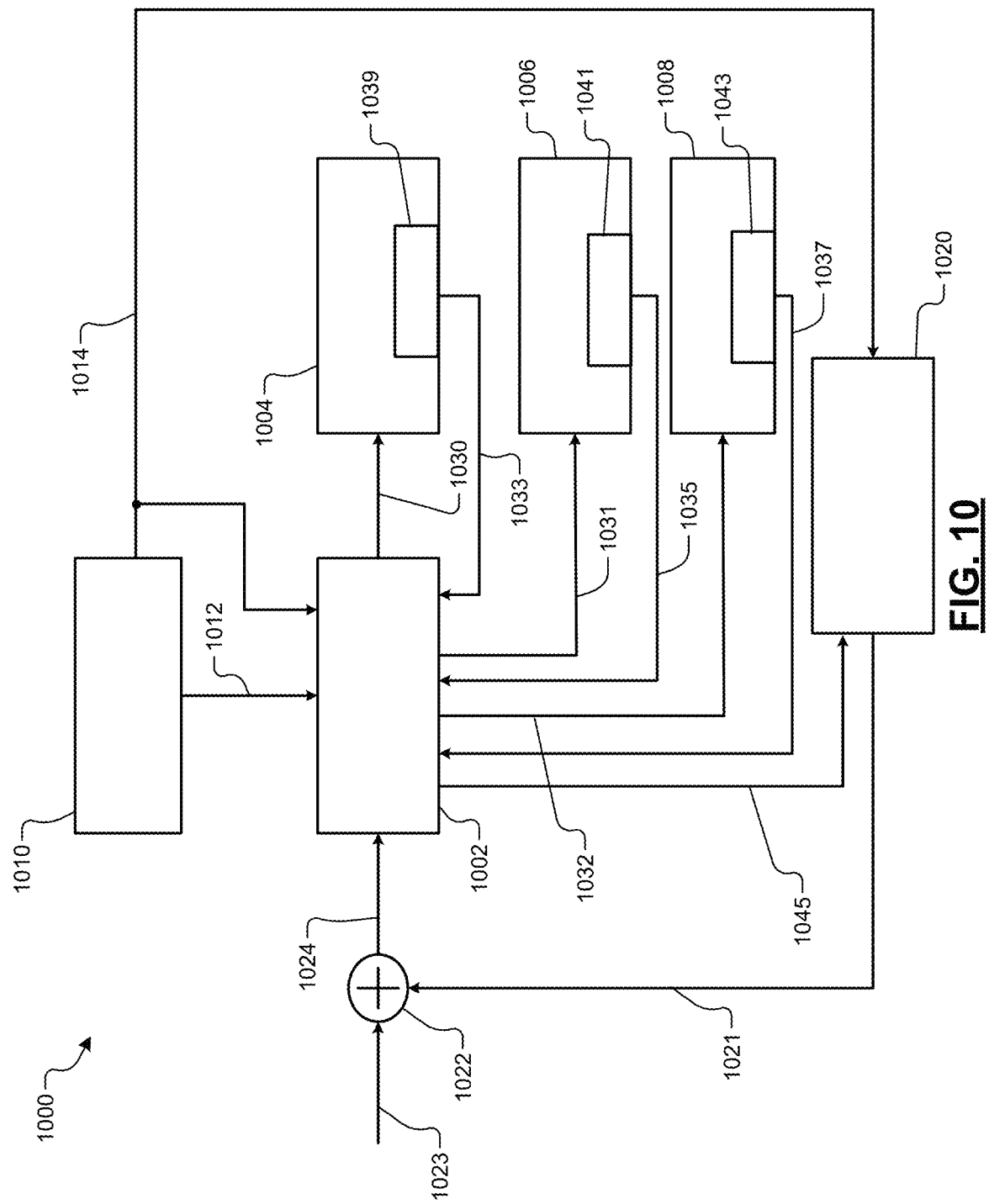

MATERIAL RECONDITIONING DEVICES AND DISPENSING SYSTEMS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to adhesive dispensing devices and systems.

A dispensing system for dispensing an adhesive material can include a pump configured to pump an adhesive from a reservoir (or container) to a chamber of a doser via a first pipeline. The doser may operate as a syringe and pressurize and/or drive the adhesive material from the chamber to an applicator via a second pipeline. The applicator then directs the adhesive material onto a production part, such as a vehicle component, a door, a headliner, a deck lid, etc. The adhesive material may be applied for adhesion, increased rigidity, increased sound dampening, and/or other purposes.

SUMMARY

A reconditioning device is disclosed and includes: a first shearing plate; a second shearing plate; and a housing. The housing includes: a first member configured to hold the first shearing plate and comprising an input for receiving a material; a second member connected to the first member to form an inner cavity, a portion of the inner cavity is located in a gap between the first shearing plate and the second shearing plate; and an output member connected to a pipeline of a production applicator and configured to output the material subsequent to shearing. The shaft extends through the second member, is connected to the second shearing plate, and is configured to be rotated to shear the material disposed in the gap between the first shearing plate and the second shearing plate.

In other features, the reconditioning device further includes a disc disposed in the inner cavity and configured to hold the second shearing plate, wherein the disc is connected to the shaft.

In other features, at least one of the first shearing plate and the second shearing plate includes a sinusoidal and rippled shearing surface.

In other features, at least one of the first shearing plate and the second shearing plate includes a dimpled surface.

In other features, the reconditioning device further includes a bearing assembly mounted on the shaft and allowing the disc to rotate relative to the second member.

In other features, the first shearing plate is fastened to the first member and does not rotate. The second shearing plate is fastened to the disc and rotates with the disc. The material is received at a first opening in a first side of the first member and output from a second opening in a second side of the first member.

In other features, a reconditioning system is provided and includes: the reconditioning device; a first motor connected to and configured to rotate the shaft; and a control module configured to control a parameter of the first motor to control a shearing rate of the reconditioning device.

In other features, the reconditioning system further includes one or more sensors configured to detect one or more parameters of the material. The control module is configured to adjust a parameter of the first motor based on the one or more parameters of the material.

In other features, the one or more parameters include at least one of pressure, flow rate and temperature.

In other features, a reconditioning and dispensing system is provided and includes: the reconditioning system; a chamber configured to receive the material; and a doser configured to direct the material out of the chamber and to an applicator. The reconditioning device shears the material prior to being received at the chamber or subsequent to being output from the chamber. The control module is configured to control a second motor of the doser to direct the material out of the chamber.

In other features, the reconditioning and dispensing system further includes one or more sensors configured to detect one or more parameters of the material. The control module is configured to adjust a parameter of the second motor based on the one or more parameters of the material.

In other features, the reconditioning and dispensing system further includes one or more sensors configured to detect one or more parameters of the material. The control module is configured to estimate a viscosity of the material based on the one or more parameters of the material and adjust operation of the second motor based on the estimated viscosity.

In other features, the control module is configured to: estimate a pre-pressure for the material based on a condition and a shearing history of the material; and prior to shearing the material, adjust pressure of the material in the reconditioning and dispensing system to the estimated pre-pressure.

In other features, the control module is configured to control: supplying of the material to the reconditioning device to shear the material in the reconditioning and dispensing system prior to being received at the chamber; and at least one of pushing and driving the material out of the chamber to the applicator from which the material is applied to a part.

In other features, the control module is configured to control: supplying of the material in the reconditioning and dispensing system to the chamber; and at least one of pushing and driving the material out of the chamber to the reconditioning device to shear the material prior to being received at the applicator from which the material is applied to a part.

In other features, a delivery system is provided and includes: the reconditioning system; the production applicator disposed downstream from the chamber and configured to receive the material and apply the material to a part; sensors configured to detect a pressure and a flow rate of the material; and a robot configured to adjust a position of the part relative to the applicator. The control module is configured to, based on the pressure and the flow rate of the material and capacity of the first motor, adjust a speed of the robot to adjust a speed of movement of the part relative to the applicator.

In other features, a reconditioning and dispensing method is disclosed and includes: receiving a request for an amount of material to be applied on a production part, the request indicating at least one of a volume and a flow rate; monitoring parameters of a reconditioning and dispensing system; estimating viscosity of the material existing in the reconditioning and dispensing system based on the monitored parameters; determining a target shear rate based on the estimated viscosity; shearing the material existing in the reconditioning and dispensing system at the target shear rate to recondition the material existing in the reconditioning and dispensing system; and dispensing the reconditioned material onto the production part.

In other features, the reconditioning and dispensing method further includes: estimating a pre-pressure for the material existing in the reconditioning and dispensing system based on a condition and a shearing history of the material existing in the reconditioning and dispensing system; and prior to shearing the material in the reconditioning and dispensing system, adjusting pressure of the material in the reconditioning and dispensing system to the estimated pre-pressure.

In other features, the reconditioning and dispensing method further includes: supplying the material in the reconditioning and dispensing system to a first reconditioning device to shear the material in the reconditioning and dispensing system prior to being received at a chamber of a doser; and at least one of pushing and driving the material out of the chamber to an applicator from which the material is applied to the production part.

In other features, the reconditioning and dispensing method further includes: supplying the material in the reconditioning and dispensing system to a reconditioning device to shear the material in the reconditioning and dispensing system prior to being received at a chamber of a doser or subsequent to being received at the chamber of the doser; and at least one of pushing and driving the material out of the chamber to an applicator from which the material is applied to the production part.

In other features, the reconditioning and dispensing method further includes: supplying the material in the reconditioning and dispensing system to a chamber of a doser; and at least one of pushing and driving the material out of the chamber to a reconditioning device to shear the material in the reconditioning and dispensing system prior to being received at an applicator from which the material is applied to the production part.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is a perspective view of a reconditioning device in accordance with the present disclosure;

FIG. 4 is a cross-sectional and functional block diagram of a shear rate control system including the reconditioning device of FIG. 3 in accordance with the present disclosure;

FIG. 10 is a signal flow diagram of a reconditioning and dispensing system in accordance with the present disclosure.

In the drawings, reference numbers may be reused to identify similar and/or identical elements.

DETAILED DESCRIPTION

Figure 1:
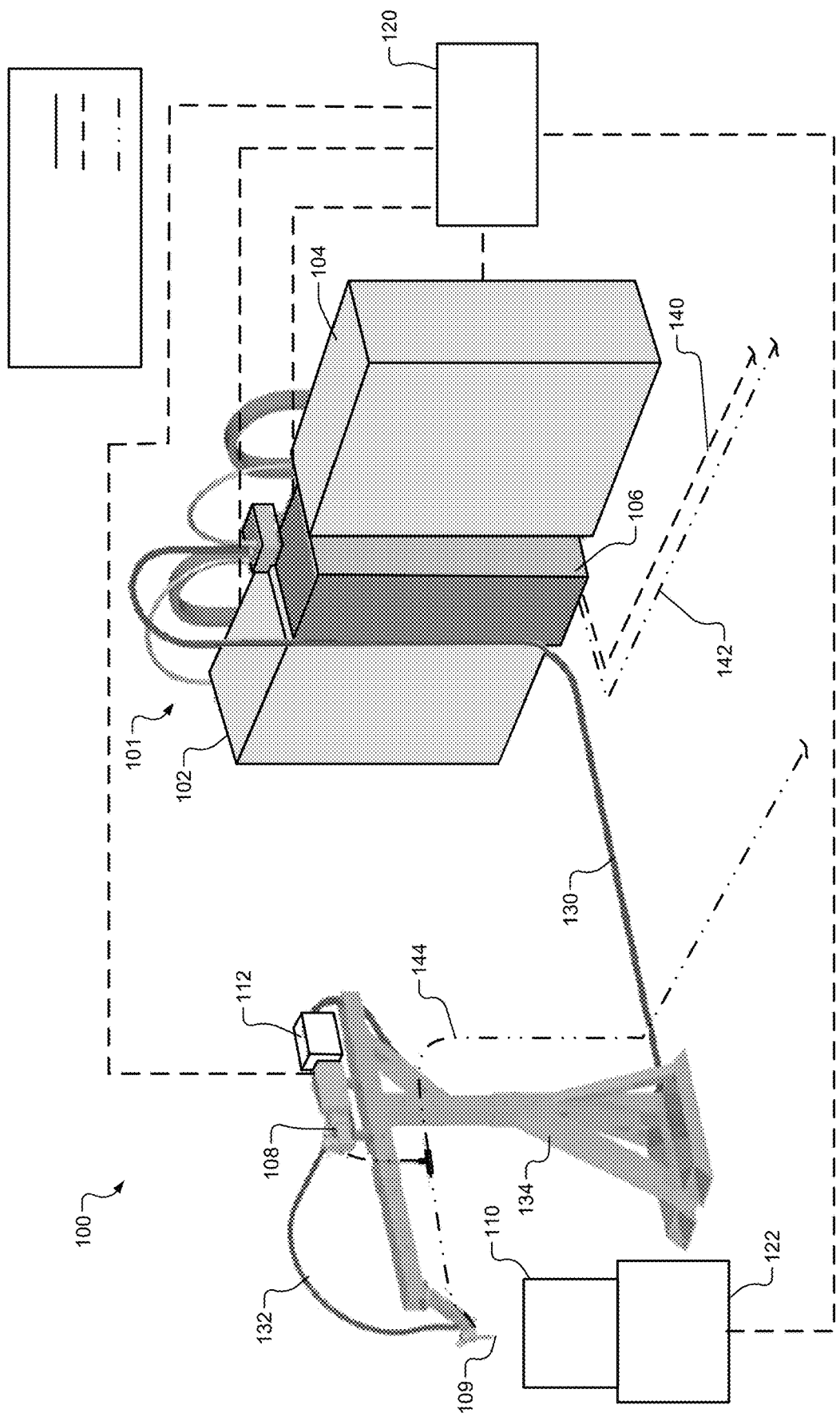
FIG. 1 is a perspective and functional block diagram of a reconditioning and dispensing system including a reconditioning device and a control module in accordance with the present disclosure.

During use of a dispensing system, corresponding production dispensing equipment of the dispensing system can experience inaccuracies in volume flow control when adhesive material viscosity changes. As an example, a part on which an adhesive material is being applied may have target bead width and/or volume requirements. As the viscosity changes, the size of the bead may decrease and/or flow rate of the adhesive material may decrease. Flow of the adhesive material may fluctuate, stop, and/or be inconsistent. This can cause inappropriate application of the adhesive material and result in a defective part.

The longer an adhesive material remains in the dispensing system without being directed out an applicator, the higher the viscosity of the material and the slower the flow rate of the material. An adhesive material may mature to a point beyond which a pump is able to pump the adhesive material through a pipeline of the dispensing system. Also, temperature fluctuations changes viscosity. The lower the temperature of the adhesive, the higher the viscosity and the slower the flow rate of the material. In addition, batch-to-batch variations in the adhesive material can affect controlled flow rate of the adhesive material due again to changes in viscosity between batches.

The examples set forth herein include reconditioning devices and corresponding dispensing systems. The recondition devices shear adhesive material to decrease viscosity of the material and allow for increase in flow rate of the material. The dispensing systems monitor pressures, flow rates, and/or temperatures of the adhesive material and adjust shear rates to accurately control flow rates and dispensing of the adhesive material.

The reconditioning devices modify material properties such as viscosity and may be used to modify flow rate of material. The reconditioned material is used to rapidly resume dispensing. The material properties are estimated based on outputs from pressure, flow rate and/or temperature sensors and a history of shearing. The material properties are then modified using the reconditioning devices based on the sensor outputs and the history of shearing to provide the reconditioned material having target material properties. Changes in flow rate are predicted based on viscosity estimations and flow is controlled for accurate volume output consistency.

A traditional dispensing system typically includes a vision system for visually inspecting flow output and/or parts to determine if a proper amount of adhesive material have been applied in the correct locations on a part. By including reconditioning devices that shear adhesive material and providing corresponding control to control the shear rates, durations and timing of shearing, the disclosed dispensing systems are able to resume and/or accurately control and adjust flow rate and volume output of adhesive material. This allows for self-adjustment when fluctuations in viscosity levels are experienced and prevents an inaccurate amount of adhesive material from being dispensed. As a result, a need for a vision system to visually inspect parts is not needed with the disclosed dispensing systems. Although not needed, a vision system may be included for application location and/or volume verification purposes.

The reconditioning devices include shearing plates, which may have different surface profiles as further described below to provide different flow fields and/or different rates of shearing. The reconditioning devices are able to change material viscosity through shearing. The reconditioned material is able to be tunneled through pipes and other components of a dispensing system filled with unconditioned materials (with higher viscosity) allowing for production, for example, of an assembly of a vehicle to quickly resume.

Figure 2:
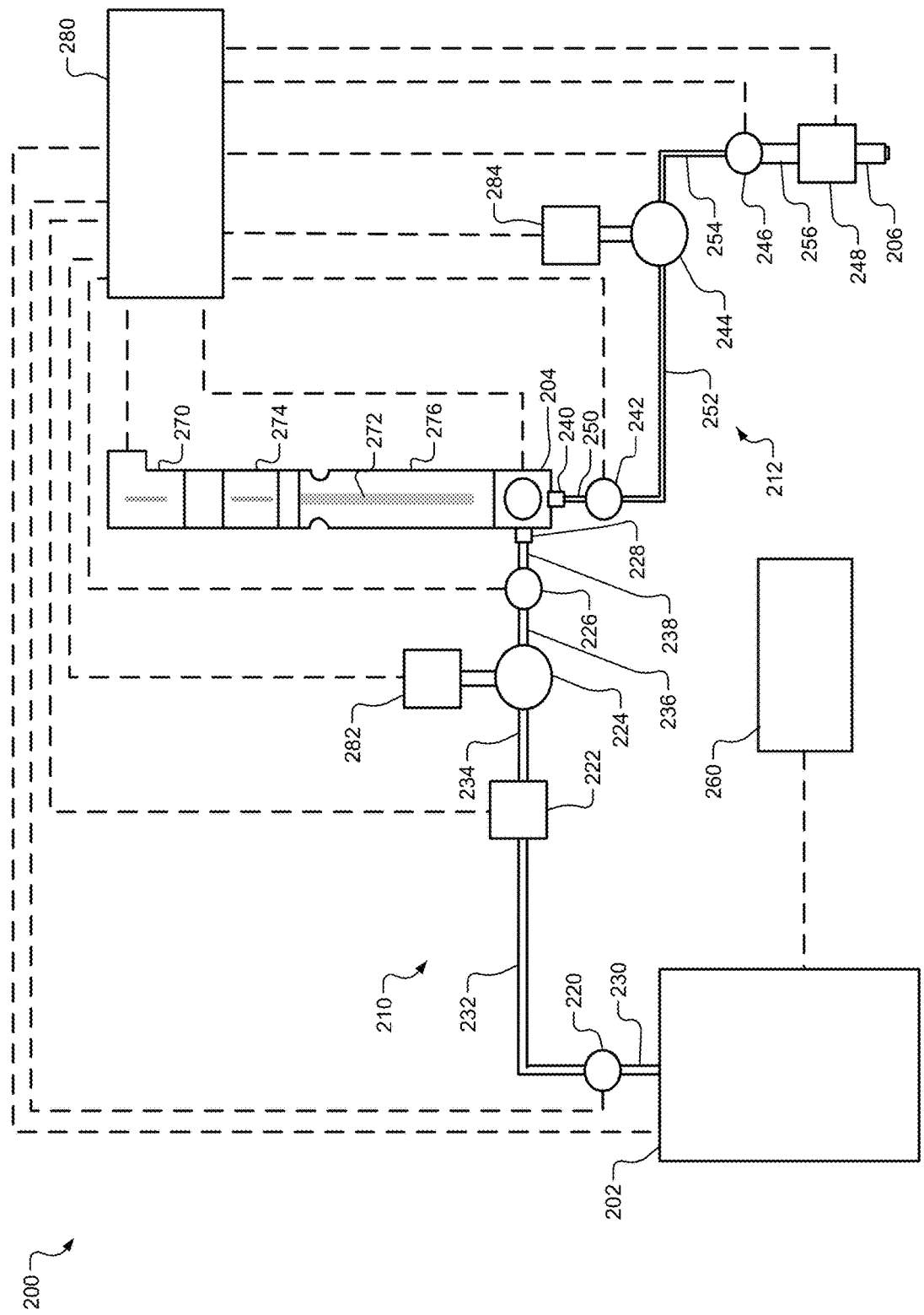
FIG. 2 is a functional block diagram of another reconditioning and dispensing system including multiple reconditioning devices and a control module in accordance with the present disclosure.

FIG. 1 shows a reconditioning and dispensing system 100 that includes a material supply system 101 including pumps 102, 104 and a pump controller 106. The pump controller 106 controls delivery of material from the pumps 102, 104 to a doser (also referred to as a shot meter) 108 that feeds the material to a production applicator (hereinafter referred to as "the applicator") 109. The applicator 109 applies the material to a part 110. The material may be an adhesive material. A reconditioning system 112 is connected in series between the pump controller 106 and the doser 108. The reconditioning system 112 shears the material to reduce viscosity of the material. Although a single reconditioning system is shown in FIG. 1, more than one reconditioning system may be included and connected between the pump controller 106 and the applicator 109. The reconditioning system 112 may include a reconditioning device and a motor, examples of which are shown in FIGS. 2-4.

A control module 120 may control operation of the pumps 102, 104, the pump controller 106, the doser 108, the motor of the reconditioning system 112, and/or a robot 122. This control may be based on feedback from sensors, such as pressure, flow rate, and temperature sensors. Example sensors are shown in FIG. 2. The control module 120 may control, based on the outputs of the sensors, the speed, pressure, volume of flow, and flow rate of the material from the pumps 102, 104 to the applicator 109 through pipes 130 and 132. The control module 120 may also control the speed of the translation speed of the part 110 and/or robot 122 based on outputs of the sensors. This includes controlling the relative speed between the applicator 109 and the part 110.

The pipe 130 may have a larger inner diameter than the pipe 132. The doser 108 and the reconditioning system 112 may be disposed on a stand 134. The part 110 may be located on a robot 122, which may position and move the part 110 relative to the applicator. In another embodiment, the applicator 109 is located on a robot, which moves the applicator 109 relative to the part 110. Although the doser 108 and applicator 109 are shown on the stand 134 and the part 110 is shown on the robot 122, the doser 108 and the applicator 109 may be mounted on the robot 122 and the part 110 may be mounted on the stand 134.

The pump controller 106 has a power supply line 140 that receives power from a power source (not shown). Air is supplied to the pump controller 106 and to the doser 108 via lines 142, 144.

FIG. 2 shows a reconditioning and dispensing system 200 that may be incorporated as part of the reconditioning and dispensing system 100 of FIG. 1. The reconditioning and dispensing system 200 includes a material supply system 202, a chamber 204 and an applicator 206. The material supply system 202 may be configured similarly as the material supply system 101 of FIG. 1. A first pipeline 210 exists between the material supply system 202 and the chamber 204. A second pipeline 212 exists between the chamber 204 and the applicator 206. The pipeline 210 directs and is used to control transfer of material (e.g., adhesive material) from the material supply system 202 to the chamber 204. The pipeline 212 directs and is used to control transfer of the material from the chamber 204 to the applicator 206.

In an embodiment, the pipeline 212 is not included and the applicator 206 is directly connected to the chamber 204. In yet another embodiment, a material output of the chamber 204 is provided directly or indirectly to a reconditioning device (e.g., the reconditioning device 244) and a material output of the reconditioning device is provided directly or indirectly to the applicator 206.

Each of the pipelines 210, 212 may include one or more reconditioning devices, one or more pressure sensors, one or more flow rate sensors, and/or one or more temperature sensors. In the example shown, the first pipeline 210 includes a first pressure sensor 220, a flow rate sensor 222, a first reconditioning device 224, a second pressure sensor 226, a chamber inlet valve 228 and pipes 230, 232, 234, 236, 238 connected therebetween. Also, in the example shown, the second pipeline 212 includes a chamber outlet valve 240, a third pressure sensor 242, a second reconditioning device 244, a fourth pressure sensor 246, a second flow rate sensor 248, and pipes 250, 252, 254, 256 therebetween. Although each of the pipelines 210, 212 are shown having a particular number of pressure sensors, flow rate sensors, and reconditioning devices, a different number of each may be included in the pipelines 210, 212. Temperature sensors 260 may also be included and incorporated along the pipelines 210, 212 to measure temperatures of material in, for example, the chamber 204, the applicator 206 and/or the pipes 230, 232, 234, 236, 238, 250, 252, 254, 256. The temperature sensors 260 may be implemented as thermocouples. The reconditioning devices 224, 244 and/or other reconditioning devices may be configured similarly as the reconditioning device shown in FIGS. 3-4.

The reconditioning and dispensing system 200 further includes a servo motor 270 that may drive a lead screw 272 via a gear box 274 to pressurize the chamber 204 and/or push the material from the chamber 204 through the second pipeline 212. The lead screw 272 is located in a housing 276. A linear sensor may be incorporated to detect a position and/or location of the lead screw 272, which is monitored by a control module 280. The servo motor 270 is controlled by the control module 280. The control module 280 also controls motors 282, 284 that drive the reconditioning devices 224, 244. The control module 280 controls the speeds, on times and durations, frequencies, duty cycles, etc. of the motors 270, 282, 284 based on outputs of the sensors 220, 222, 226, 242, 246, 248, 260.

The inner diameters of the pipes 230, 232, 234, 236, 238 may be the same and larger than the inner diameters of the pipes 250, 252, 254, 256. The inner diameters of the pipes 250, 252, 254, 256 may be the same.

The reconditioning devices 224, 244 and the sensors 220, 222, 226, 242, 246, 248, 260 may be at various locations along the pipelines 210, 212. In one embodiment, reconditioning devices 224, 244 and pressure, flow rate and temperature sensors are located at or near choke points. As an example, a choke point may exist at the inlet valve 228 and another choke point may exist at the applicator 206. The choke points may refer to points having smallest inner diameters or cross-sectional areas, at bends in a pipeline, etc. The control module 280 coordinates flow to the chamber 204, out of the chamber 204, and out of the applicator 206 based on outputs from the sensors 220, 222, 226, 242, 246, 248, 260. The reconditioning devices 224, 244 and the sensors 220, 222, 226, 242, 246, 248, 260 may be located at or near outputs of the material supply system 202 and the chamber 204. In one embodiment, the chamber 204 is refilled within a predetermined period (e.g., 0.5 minutes to 10 minutes) of when a cycle of material is to be passed through the applicator 206, depending on: the type of material; the curing time of the material; the rate of viscosity change of the material due to sitting; and the application of the material. This is done to minimize time of the material sitting in the pipelines 210, 212 and the chamber 204 and increase probability of low viscosity material existing in the pipelines 210, 212 and the chamber 204.

FIG. 3 shows a reconditioning device 300 having a housing with a first (or top) member 302 and a second (or base) member 304. The base member 304 may be referred to as the first member and the top member 302 may be referred to as the second member. The top member 302 has a hole through which a drive shaft inputs torque for spinning a shear disk (or plate), which is shown in FIG. 4. It can include torque sensor on the shaft 306 for measuring resulting torques at the same time. The output of the torque sensor along with the motor rotation speed can be used in the control of flow and pressure of material in the corresponding system. The shaft 306 is configured to connect to a motor, as shown in FIG. 4.

FIG. 4 shows a shear rate control system 400 that includes the reconditioning device 300, a motor 402 and a control module 404 (e.g., one of the control modules of FIGS. 1-2. The reconditioning device 300 includes the top member 302 and the base member 304, which are connected to each other via first fasteners (e.g., bolts 406 and nuts 408).

The reconditioning device 300 further includes a pair of shearing plates 410, 412 that face each other. The shearing plate 410 is connected to and rotated by a disc 414, which is attached to the shaft 306. The shearing plate 410 is connected to the disc 414 via fasteners 416. The fasteners 416 are screwed into inserts 417 in the disc 414. In another embodiment, the shearing plate 410 and the disc 414 are integrally formed as a single plate. In another embodiment, the disc 414 is configured as a shearing plate and the shearing plate 410 is not included. The shearing plate 412 is fixed to the base member 304 via fasteners 418. The fasteners 418 screw into inserts 420, which are in holes of the base member 304. In another embodiment, an opposite arrangement is provided, where there are blind holes in the back side of the shearing plate 412 and screws are extended through holes in the base member 304 and screwed into the blind holes from the back side of the shearing plate 412.

The top member 302 includes bearings 430 on which the shaft 306 rotates. The bearings 430 is part of a bearing assembly 431. The bearing assembly allows the shaft and the disc 414 to rotate relative to the top member 302. A ring-shaped flange 432 is disposed between the top member 302 and the bearings 430 and holds the bearing assembly 431 in place against a backside of the disc 414. A first ring-shaped seal 433 is disposed between the members 302, 304. A second ring-shaped seal 434 is disposed between the disc 414 and the top member 302.

During operation, material is injected into an open area (or gap) 440 between the plates 410, 412 through a central passage 442, as indicated by arrow 443. The gap refers to a distance between the plates 410, 412, represented as h. The open area 440 is a portion of an inner cavity 441 formed by the coupling of the members 302, 304. The shearing plate 410 is rotated to shear the material in the open area 440 and then is output through an output passage 444 of an output member 447 of the base member 304, as indicated by arrow 445. The output member 447 may be integrally formed as part of the base member 304 as shown or as part of the top member 302. The control module 404 controls the speed, on times and durations, frequencies, duty cycles, etc. of the motor 402. Material being sheared enters the reconditioning device 300 at a low shearing zone, is sheared and exists at a high shearing zone.

A torque sensor 450 may be included and connected to and/or disposed on the shaft 306 and measure an input torque provided via the shaft 306. When including the torque sensor 450, the reconditioning device 300 performing as a dual-purpose device because the recondition device 300: 1. reduces material viscosity for improved flow; and 2. indirectly measures viscosity by using the torque the shaft is sustaining and the motor rotational speed. The control module 404 may calculate the viscosity based on the torque and rotational speed output of the reconditioning device 300. The control module 404 controls operation of the motor 402 including output torque, frequency, speed, duty cycle, on times and durations of the motor 402 based on the torque indicated by the torque sensor 450.

Figure 5:
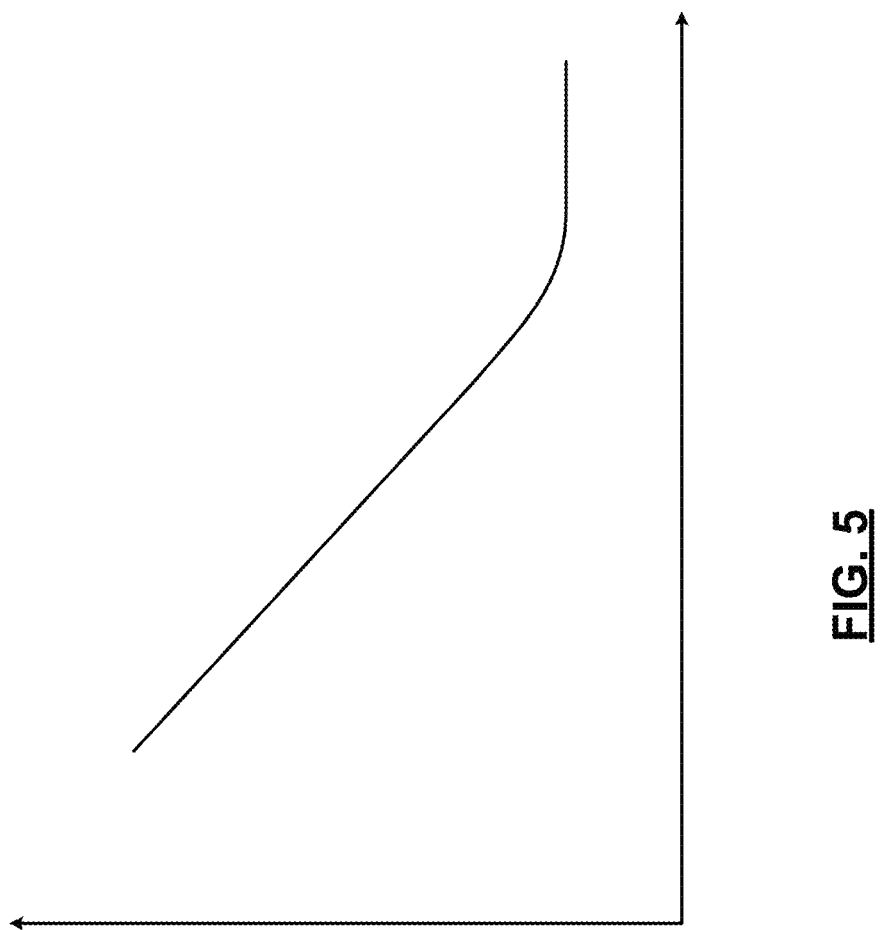
FIG. 5 is a plot of viscosity versus shearing time.

FIG. 5 shows a plot of viscosity versus shearing time. As shearing time increases the viscosity decreases. When material is sheared, viscosity of the material reduces, as shown by the plot of FIG. 5, and referred to as "thixotropy", which is time dependent thinning. As the shear rate, measured in reciprocal seconds, increases, the viscosity may also decrease. Thus, as the shear time of a reconditioning device increases, the viscosity of the material through the reconditioning device may also decrease, which decreases resistance to flow of the material and allows for an increase in flow rate of the material. As viscosity reduces, flow of material is easier.

The magnitude of reduction in viscosity due to thixotropy is likely less than an order of magnitude. Controlled shearing of material aids in maintaining a consistent viscosity of the material for consistent application of the material. The reconditioning devices disclosed herein are used to condition material being applied to have a target viscosity and to maintain the material at the target viscosity.

The shearing plates 410, 412 of FIG. 4 may instead of having flat shearing surfaces as shown in FIG. 4, may each have various different types of shearing surfaces with different shearing surface profiles. Some example shearing plates with different shearing surface profiles are shown in FIGS. 6-9. The shearing plates 410, 412 may have the same or different shearing surface profiles. In one embodiment, one of the shearing plates 410, 412 has one of the shearing surface profiles of FIGS. 6-9 and the other one of the shearing plates 410, 412 has a flat shearing surface profile. The amount of shearing can be increased for a same rotational speed of a shearing plate by changing the shearing surface profile of the shearing plate. The surface textures on the shearing plates may introduce extensional flow of material and can also have an additional contributing effect on the reduction of viscosity. The shearing plates of FIGS. 6-9 may replace the shearing plates 410, 412 of FIG. 4.

Figure 6:
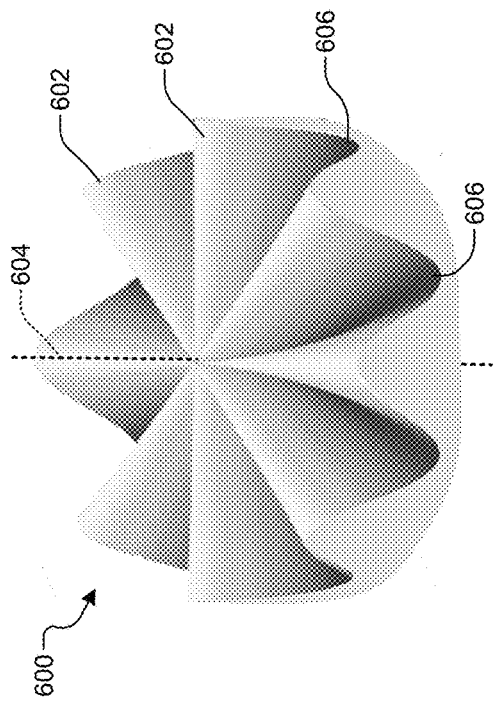
FIG. 6 is a perspective view of a shearing plate including a sinusoidal and rippled shearing surface in an annular direction including linear-shaped protrusions extending from a central axis in accordance with the present disclosure.

FIG. 6 shows a shearing plate 600 including a sinusoidal and rippled shearing surface. The sinusoidal pattern is seen by a cross-section in an annular (or tangential/circumferential) direction through the shearing plate 600. The shearing plate 600 includes linear-shaped protrusions 602 extending from a central axis 604. Valleys 606 exist between the linear-shaped protrusions 602.

Figure 7:
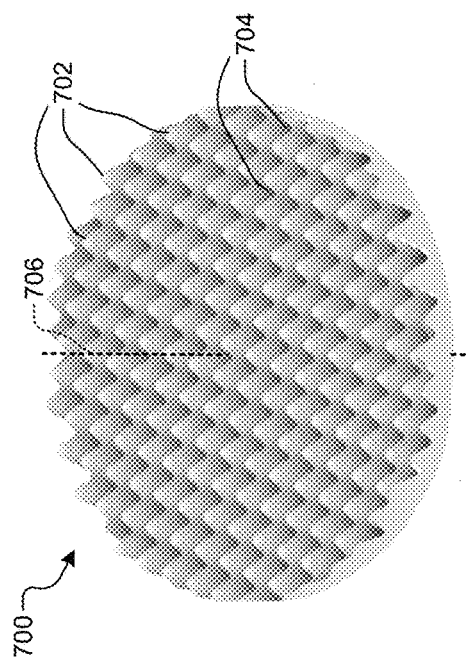
FIG. 7 is a perspective view of a shearing plate including a dimpled shearing surface in accordance with the present disclosure.

FIG. 7 shows a shearing plate 700 including a dimpled shearing surface with protrusions 702 between "dimples" (or depressions) 704. The shearing plate 700 has a central axis 706. A pattern of the protrusions 702 and depressions 704 extends across the shearing plate 700.

Figure 8:
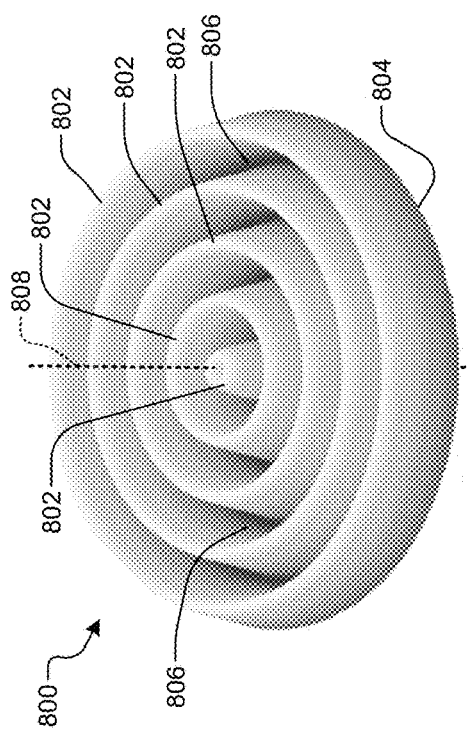
FIG. 8 is a perspective view of a shearing plate including a ringed and sinusoidally rippled shearing surface in a radial direction in accordance with the present disclosure.

FIG. 8 shows a shearing plate 800 including a ringed and sinusoidally rippled shearing surface. The sinusoidal pattern is seen by a cross-section in a radial direction through the shearing plate 800. The shearing plate 800 includes concentric ring-shaped protrusions 802 that protrude away from a base and/or bottom surface 804 of the shearing plate 800. The shearing plate 800 also includes concentric ring-shaped valleys 806 between the ring-shaped protrusions 802. The ring-shaped protrusions 802 and the ring-shaped valleys 806 are concentric and centered about a central axis 808.

Figure 9:
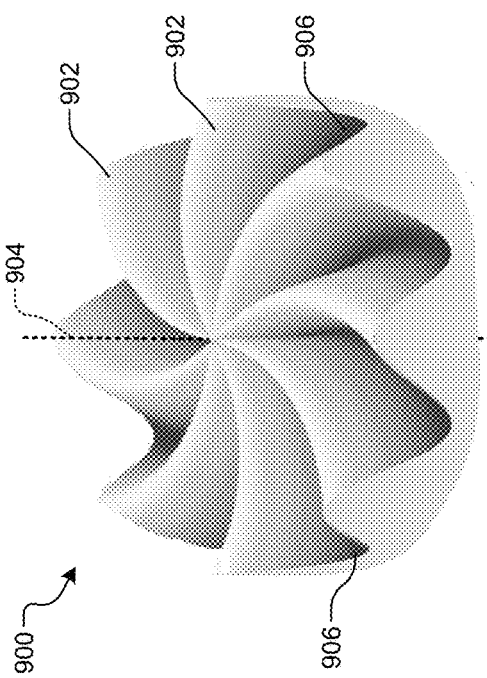
FIG. 9 is a perspective view of a shearing plate including a sinusoidal and rippled shearing surface in an annular direction including spiral-shaped protrusions extending from a central axis in accordance with the present disclosure.

FIG. 9 shows a shearing plate 900 including a sinusoidal and rippled shearing surface. The sinusoidal pattern is seen by a cross-section in an annular (or tangential/circumferential) direction through the shearing plate 900. The shearing plate 900 includes spiral-shaped protrusions 902 extending from a central axis 904. Spiral-shaped valleys 906 exist between the spiral-shaped protrusions 902.

FIG. 10 shows a signal flow diagram 1000 of a reconditioning and dispensing system, such as that shown in FIGS. 1-2. The signal flow diagram 1000 includes a control module 1002 (e.g., one of the control modules of FIGS. 1-2 and 4) that controls a doser servo motor 1004 and one or more reconditioning devices, a first reconditioning device motor 1006 and a second reconditioning device motor 1008 are shown. The reconditioning device motors 1006, 1008 may be the reconditioning device motors 282, 284 of FIG. 2. The reconditioning devices are used for viscosity refinement purposes and to make use of a "tunneling effect" to transition from a high-viscosity material to a low-viscosity material to quickly resume production. Conditioned material that has been sheared is able to tunnel through sitting material and pipes to allow production to resume. The conditioned material reduces the overall material viscosity in the pipeline(s).

The control module 1002 receives signals from sensors, such as flow rate and pressure transducers 1010, which monitor flow rates and pressures in pipelines (e.g., the pipelines 210, 212 of FIG. 2). Signal line 1012 represents flow rates and pressures upstream from a doser chamber (e.g., the chamber 204 of FIG. 2). Signal line 1014 represents flow rates and pressures downstream from the doser chamber.

A volume and flow rate estimator 1020 may estimate a volume of material through and a material flow rate at an applicator (e.g., one of the applicators 109, 206) downstream from the doser chamber based on the flow rates and pressures detected downstream from the doser chamber. The estimated volume and flow rate are represented by arrow 1021. A summer 1022 may subtract the estimated volume and/or flow rate 1021 from a requested volume and/or flow rate 1023 to provide a corrected volume and/or flow rate request 1024. Direct flow estimate at the applicator (or nozzle) provides improved accurate flow feedback.

The control module 1002 generates motor control signals 1030, 1031, 1032 that are provided respectively to the doser servo motor 1004, the first reconditioning device motor 1006, and the second reconditioning device motor 1008. The motor control signals 1030-1032 are generated based on: the flow rates and pressures 1012; the flow rates and pressures 1014; shearing history; temperatures; a position, rotational speed and/or output torque signal 1033 of the doser servo motor 1004; a position, rotational speed and/or output torque signal 1035 from the first reconditioning device motor 1006; and/or a position, rotational speed and/or output torque signal 1037 of the second reconditioning device motor 1008. The shearing history refers to the previously performed shearing and corresponding shearing parameters over time. The shearing parameters include shearing rates, shearing times, shearing durations, etc. The position, rotational speed and/or output torque of the doser servo motor 1004 may be detected by sensors 1039 on the doser servo motor 1004. The position, rotational speed and/or output torque signal of the first reconditioning device motor 1006 may be detected by sensors 1041. The position, rotational speed and/or output torque signal of the second reconditioning device motor 1008 may be detected by sensors 1043. The signals 1035, 1037 may indicate position, rotational speed and/or torque of the shafts of the reconditioning device motors 1006, 1008.

The control module 1002 may estimate viscosity of the material based on: the flow rates and pressures 1012; the flow rates and pressures 1014; shearing history; temperatures; and the position, rotational speed and/or one or more of the output torque and rotational speed signals 1033, 1035, 1037 and then generate the motor control signals 1030-1032 based on the estimated viscosity. The control module 1002 may predict a reduction in flow based on the estimated viscosity and adjust parameters of the motors 1004, 1006, 1008 to prevent an increase in viscosity and/or a reduction in flow. The volume and flow rate estimator 1020 may estimate the volume of material through and the material flow rate at the applicator based on the estimated viscosity indicated by a viscosity signal 1045.

The generation of the motor control signals 1030-1032 may also be based on how much shearing is targeted in each of the reconditioning devices and an amount of motor torque of the reconditioning device motors 1006, 1008 to achieve targeted flow rates in pipelines and/or through the applicator. This provides accurate flow output control of material.

Figure 11:
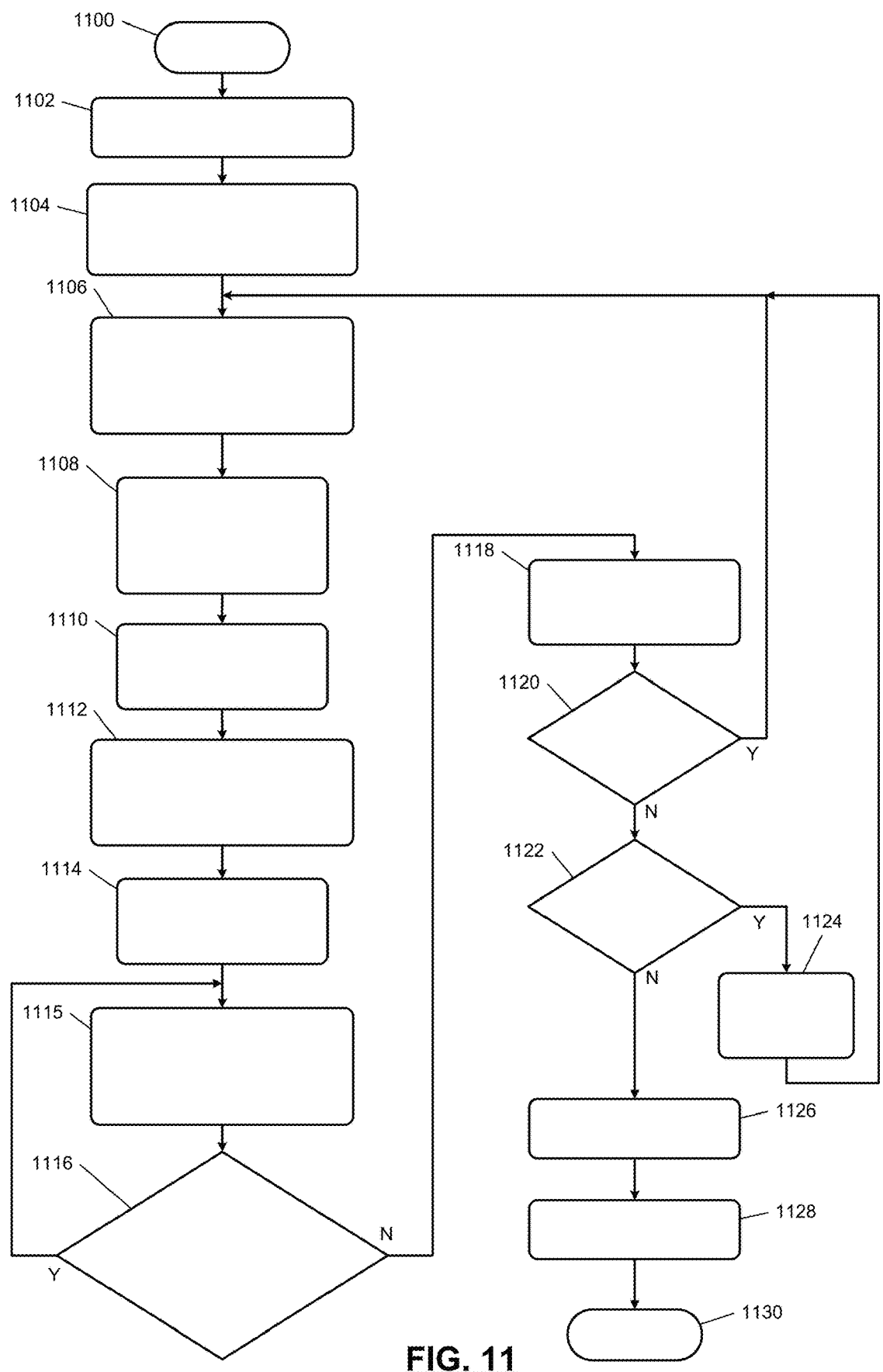
FIG. 11 illustrates a reconditioning and dispensing method in accordance with the present disclosure.

FIG. 11 shows a reconditioning and dispensing method. The method may be implemented by the reconditioning and dispensing systems disclosed herein. The following operations may be performed by any of the control modules, motors, and sensors disclosed herein. The following operations may be iteratively performed. Although the following operations are primarily described with respect to FIG. 2, the operations are applicable to other embodiments of the present disclosure.

The operations may begin at 1100. At 1102, the control module 280 receives a volume and flow demand request. This may include a requested volume and flow rate of material to be applied on a part. At 1104, the control module 280 pre-pressurizes material to be dispensed that is in the chamber 204. The target pre-pressure of the material may be estimated based on a material model for viscosity. The material model is used to calculate the pre-pressure based on flow demand. The material model for viscosity may defined as a function of material condition (e.g. age and/or state of cure), properties of the material (e.g. shear rate dependence)

and shearing history. Viscosity changes due to shearing history and material condition. The viscosity may also be estimated based on sensor outputs of the reconditioning device(s) (i.e., torque and motor rotational speed) in the corresponding system. In an embodiment, the target pre-pressure is set based on an estimate of viscosity of the material in the dispensing system (e.g., in the pipelines 210, 212 and chamber 204).

At 1106, the control module 280 monitors parameters including flow rates, pressures and/or temperatures of material passing through the pipelines 210, 212. As an example, the control module 280 may operate the dispensing in a flow control module or a pressure control mode.

Viscosity may be estimated based on the measured parameters as indicated by outputs of corresponding sensors. Each of these parameters may be measured and/or estimated for one or more points in the reconditioning and dispensing system.

At 1108, the control module 280 controls flow of material to the first reconditioning device 224 via a portion of the first pipeline 210 by pumping the material to the first reconditioning device 224. This may be based on outputs of the sensors 220, 222, 226, 242, 246, 248, 260, shearing history, and volume and flow demand requested. The control module 280 controls the shear rate of the first reconditioning device 224. The first reconditioning device 224 may operate as a passthrough device if no shearing is needed or may operate as a shearing device if a target level of shearing determined. A viscosity of the material may be estimated based on sensor outputs, reconditioning device torque levels, and/or rotational speed of input shafts and/or shearing plates of reconditioning devices. The required shear rate for the first reconditioning device 224 may be determined based on the estimated viscosity as further described below with respect to operation 1118.

At 1110, the control module 280 supplies material from the first reconditioning device to the chamber 204 by opening inlet valve 228.

At 1112, the control module 280 controls the servo motor 270 to drive material in the chamber 204 to the second reconditioning device 244 via a portion of the second pipeline 212. This may be based on outputs of the sensors 220, 222, 226, 242, 246, 248, 260, shearing history, and volume and flow demand requested. The control module 280 controls the shear rate of the second reconditioning device 244. The second reconditioning device 244 may operate as a passthrough device if no shearing is needed or may operate as a shearing device if a target level of shearing determined. A viscosity of the material may be estimated based on the may be estimated based on sensor outputs, reconditioning device torque levels, and/or rotational speed of input shafts and/or shearing plates of reconditioning devices and/or as described below with respect to operation 1115. The required shear rate for the second reconditioning device 244 may be determined based on the estimated viscosity as further described below with respect to operation 1118.

At 1114, material is supplied from the second reconditioning device 244 to the applicator 206. This may be controlled by the control module 280 when, for example, one or more additional valves are included to adjust flow from the second reconditioning device 244 to the applicator 206.

At 1115, the control module 280 monitors parameters including flow rates, pressures and/or temperatures of material passing through the pipelines 210, 212. Viscosity may be estimated based on the parameters as indicated by outputs of corresponding sensors including flow rate, pressure, temperature, the motor torque and/or rotational speed. Each of these parameters may be measured and/or estimated for one or more points in the reconditioning and dispensing system and/or for operation in a particular mode, such as the flow control mode and the pressure control mode. In an embodiment, the viscosity is estimated based on the flow rate and/or pressure. In another embodiment, the viscosity is estimated based on the torque and rotational speed.

At 1116, the control module 280 determines whether the measured flow rate, measured pressure and/or estimated viscosity match and/or are within predetermined ranges of a target flow rate, a target pressure and/or a target viscosity. This may be determined for a specific point in the reconditioning and dispensing system or for multiple points within the reconditioning and dispensing system. If yes, the control module 280 may return to operation 1115, otherwise operation 1118 may be performed.

At 1118, the control module 280 adjusts one or more shearing rates of the one or more reconditioning devices 224, 244. The target shear rates may be determined based on the estimated viscosity levels and/or based on the parameters including the outputs of the sensors. In an embodiment, one or more look-up-tables may be used relating the target shear rates to viscosities, flow rates, pressures, and/or temperatures. In another embodiment, the target shear rates are determined based only on the estimated viscosities. In yet another embodiment, the target shear rates are determined based on a direct relationship model between a shearing time of a material and viscosity, as illustrate by FIG. 5, and a direct relationship between viscosity and temperature, as in equation 1. See for example equations 1, where A and B are constants, T is temperature, and $\eta_0$ is the zero shear viscosity.

$$\eta_0 = Ae^{\frac{B}{T}} \qquad (1)$$

This may include adjusting one or more parameters of the reconditioning device motors 282, 284, as described above, including adjusting speed, frequency, on times and durations, duty cycles, etc.

At 1120, the control module 280 may determine whether the target flow is within capacity of the servo motor 270. If yes, operation 1106 may be performed, otherwise operation 1122 may be performed.

At 1122, the control module 280 may determine whether a robot speed override flag has been triggered. If the robot speed override flag has not been triggered, a fault alert is generated 116, otherwise operation 1124 is performed.

At 1124, a speed of the robot 122 is adjusted. The speed of the robot 122 may be decreased to allow for an increased volume of material within a given surface area of the part. By adjusting the speed of the robot 122, the speed of movement of the part is adjusted relative to the applicator. This effectively reduced the demanded flow rate of material because a decreased robot speed reduces a target flow rate to satisfy a target volume to be applied within the given surface area.

At 1128, the control module 280 may pause production and cease dispensing of material until material is ready to be dispensed. This may include stopping the pumping of material, closing the valves 228, 240, stopping shearing (i.e., the motors 282, 284), and/or stopping the servo motor 270. The method may end at 1130.

Production dispense equipment faces challenges in accurate volume controls when adhesive material viscosity changes due to batch-to-batch variations, lack of shearing, and temperature fluctuations. The increased viscosity can lead to part repairs and cause frequent production line stops. The reconditioning and dispensing devices and systems disclosed herein estimate material properties, modify the material properties, improve material flow, and achieve improved and more accurate control of volumetric flow rates than traditional dispensing systems.

The disclosed systems and methods provide consistent material viscosity that enters a chamber of a doser and is directed out an applicator. The consistent viscosity of material supplied compensates for changes in viscosity of material already in a pipeline to provide consistent flow rates that drive consistent volumetric control. The disclosed systems are configured to estimate viscosity of material within a dispensing system based on sensor outputs. The sensor outputs may indicate increases in pressures, reductions in flow rate, reductions in temperature, and/or other parameters indicative of increased viscosity. The disclosed systems are able to estimate the viscosity independent of batch-to-batch variations, lack of shearing, and temperature fluctuations. The disclosed systems are able to optimize material viscosity by controlling the disclosed reconditioning devices and material flow rates. The disclosed systems are able to predict changes in flow rates based on estimated material viscosities and modify system parameters for accurate flow rate and volume output.

The disclosed systems are able to use sheared material with low viscosity to tunnel through a pipeline and resume production rapidly and reduce overall material viscosity in the whole pipeline quickly. The disclosed systems provide material with consistent viscosity, which is provided to dosers (or shot meters) to compensate for viscosity changes of the material which results in more consistent material flow rates that drive consistent volume control during application. The disclosed systems are able to estimate the viscosity of material within the systems using sensor outputs including flow rate and pressure drop within the system irrespective of batch-to-batch variations, lack of shearing, and temperature fluctuations. The disclosed systems may use a material model for volumetric flow control.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various elements, components, and/or devices, these elements, components, and/or devices should not be limited by these terms, unless otherwise indicated. These terms may be only used to distinguish one element, component, or device from another element, component, or device. Terms such as "first," "second," and other numerical terms when used herein do not imply a sequence or order unless clearly indicated by the context. Thus, a first element, component, or device discussed below could be termed a second element, component, or device without departing from the teachings of the example embodiments.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A reconditioning device comprising:
a first shearing plate;
a second shearing plate;
a housing comprising
a first member configured to hold the first shearing plate and comprising an input for receiving an adhesive material,
a second member connected to the first member to form an inner cavity, a portion of the inner cavity is located in a gap between the first shearing plate and the second shearing plate, and
an output member connected to a pipeline of a production applicator and configured to output the adhesive material subsequent to shearing, wherein the output member is configured to output the adhesive material directly from between the first shearing plate and the second shearing plate through the pipeline to the production applicator; and
a shaft extending through the second member, connected to the second shearing plate, and configured to be rotated to shear the adhesive material disposed in the gap between the first shearing plate and the second shearing plate.

2. The reconditioning device of claim 1, further comprising a disc disposed in the inner cavity and configured to hold the second shearing plate, wherein the disc is connected to the shaft.

3. A reconditioning device comprising:
a first shearing plate;
a second shearing plate,
wherein at least one of the first shearing plate and the second shearing plate comprises i) a sinusoidal and rippled shearing surface extending perpendicular to and radially from an axis of rotation of the corresponding one of the first shearing plate and the second shearing plate, or ii) a dimpled surface extending perpendicular to and radially from the axis of rotation of the corresponding one of the first shearing plate and the second shearing plate;
a housing comprising
a first member configured to hold the first shearing plate and comprising an input for receiving a material,
a second member connected to the first member to form an inner cavity, a portion of the inner cavity is located in a gap between the first shearing plate and the second shearing plate, and
an output member connected to a pipeline of a production applicator and configured to output the material subsequent to shearing; and
a shaft extending through the second member, connected to the second shearing plate, and configured to be rotated to shear the material disposed in the gap between the first shearing plate and the second shearing plate.

4. The reconditioning device of claim 1, wherein at least one of the first shearing plate and the second shearing plate comprises i) a sinusoidal and rippled shearing surface or ii) a dimpled surface.

5. The reconditioning device of claim 1, further comprising a bearing assembly mounted on the shaft and allowing a disc to rotate relative to the second member.

6. The reconditioning device of claim 1, wherein:
the first shearing plate is fastened to the first member and does not rotate;
the second shearing plate is fastened to a disc and rotates with the disc; and
the adhesive material is received at the recondition device at a first opening in a first side of the first member and is output from the reconditioning device at a second opening in a second side of the first member.

7. A reconditioning system comprising:
the reconditioning device of claim 1;

a first motor connected to and configured to rotate the shaft; and a control module configured to control a parameter of the first motor to control a shearing rate of the reconditioning device.

8. The reconditioning system of claim 7, further comprising one or more sensors configured to detect one or more parameters of the adhesive material, wherein the control module is configured to adjust a parameter of the first motor based on the one or more parameters of the adhesive material.

9. The reconditioning system of claim 8, wherein the one or more parameters include at least one of pressure, flow rate and temperature.

10. A reconditioning and dispensing system comprising:
a first reconditioning device comprising:
a first shearing plate,
a second shearing plate,
a housing comprising
a first member configured to hold the first shearing plate and comprising an input for receiving a material,
a second member connected to the first member to form an inner cavity, a portion of the inner cavity is located in a gap between the first shearing plate and the second shearing plate, and
an output member connected to a pipeline of a production applicator and configured to output the material subsequent to shearing, and
a shaft extending through the second member, connected to the second shearing plate, and configured to be rotated to shear the material disposed in the gap between the first shearing plate and the second shearing plate;
a second reconditioning device;
a control module configured to control parameters of the first reconditioning device and the second reconditioning device to control shearing rates of the first reconditioning device and the second reconditioning device; and
a chamber configured to receive the material from the first reconditioning device and output the material to the second reconditioning device,
wherein the first reconditioning device shears the material prior to being received at the chamber and the second reconditioning device shears the material subsequent to being output from the chamber.

11. The reconditioning and dispensing system of claim 10, further comprising:

a doser configured to direct the material to an applicator; and one or more sensors configured to detect one or more parameters of the material, wherein the control module is configured to adjust a parameter of a doser based on the one or more parameters of the material.

12. The reconditioning and dispensing system of claim 10, further comprising:

a doser configured to direct the material to an applicator; and one or more sensors configured to detect one or more parameters of the material, wherein the control module is configured to estimate a viscosity of the material based on the one or more parameters of the material and adjust operation of the second motor doser based on the estimated viscosity.

13. The reconditioning and dispensing system of claim 10, wherein the control module is configured to:

estimate a pre-pressure for the material based on a condition and a shearing history of the material; and prior to shearing the material, adjust pressure of the material in the reconditioning and dispensing system to the estimated pre-pressure.

14. The reconditioning and dispensing system of claim 10, wherein the control module is configured to control: at least one of pushing and driving the material out of the chamber to an applicator from which the material is applied to a part.

15. A delivery system comprising:
the reconditioning and dispensing system of claim 10;
an applicator disposed downstream from the chamber and configured to receive the material and apply the material to a part;
a plurality of sensors configured to detect a pressure and a flow rate of the material; and
a robot configured to adjust a position of the part relative to the applicator,
wherein the control module is configured to, based on the pressure and the flow rate of the material and capacity of a first motor, adjust a speed of the robot to adjust a speed of movement of the part relative to the applicator.

16. The reconditioning device of claim 1, wherein:
at least one of the first shearing plate and the second shearing plate comprises a dimpled surface; and
the dimpled surface comprises pointed peaks and valleys.

17. The reconditioning device of claim 16, wherein peaks are arranged in rows and columns across the dimpled surface.

* * * * *